United States Patent
Aoyama et al.

(10) Patent No.: US 12,505,755 B2
(45) Date of Patent: Dec. 23, 2025

(54) WELDING TRAINING SYSTEM, WELDING TRAINING METHOD, AND PROGRAM

(71) Applicants: KOBELCO E&M CO., LTD., Kobe (JP); ImaCreate Co., Ltd., Tokyo (JP)

(72) Inventors: Yuichiro Aoyama, Osaka (JP); Yasuo Oomori, Hyogo (JP); Junichi Oono, Hyogo (JP); Hideaki Ogura, Hyogo (JP); Hiroaki Taniyama, Hyogo (JP); Akihiro Yamamoto, Tokyo (JP); Hitoshi Kawasaki, Tokyo (JP)

(73) Assignees: KOBELCO E&M CO., LTD., Kobe (JP); ImaCreate Co., Ltd., Tokyo (JP)

( * ) Notice: Subject to any disclaimer, the term of this patent is extended or adjusted under 35 U.S.C. 154(b) by 109 days.

(21) Appl. No.: 18/014,711

(22) PCT Filed: Jan. 12, 2022

(86) PCT No.: PCT/JP2022/000660
§ 371 (c)(1),
(2) Date: May 9, 2024

(87) PCT Pub. No.: WO2023/135672
PCT Pub. Date: Jul. 20, 2023

(65) Prior Publication Data
US 2024/0386809 A1    Nov. 21, 2024

(51) Int. Cl.
*G09B 9/00* (2006.01)
*G06T 19/20* (2011.01)

(52) U.S. Cl.
CPC ........... *G09B 9/00* (2013.01); *G06T 19/20* (2013.01); *G06T 2210/62* (2013.01); *G06T 2219/2016* (2013.01)

(58) Field of Classification Search
CPC ................. G06T 19/20; G09B 9/00
See application file for complete search history.

(56) References Cited

U.S. PATENT DOCUMENTS

2016/0260261 A1    9/2016   Hsu

FOREIGN PATENT DOCUMENTS

| JP | 2016-532909 A | 10/2016 |
| JP | 2018-101124 A | 6/2018 |

*Primary Examiner* — Kesha Frisby
(74) *Attorney, Agent, or Firm* — Kolitch Romano Dascenzo Gates LLC (57) ABSTRACT

An information processing apparatus (1) includes a distance determination unit (13) configured to determine a distance between a tip of a welding rod object used for a welding operation and a parent material object based on a distance between the parent material object and a dot object used for distance determination, the dot object being located at the tip, a welding processing performing unit (14) configured to perform welding processing in virtual space based on the determined distance, a welding rod length corrector (15) configured to perform a correction such that an axial length of the welding rod object is shortened, a distance determination object mover (17) configured to move the dot object to the tip of the welding rod object after the correction, and a display controller (19) configured to cause a display to display an image including the corrected welding rod object and the dot object moved.

18 Claims, 6 Drawing Sheets

WELDING TRAINING SYSTEM, WELDING TRAINING METHOD, AND PROGRAM

TECHNICAL FIELD

The present invention relates to a welding training system, a welding training method, and a program for supporting a welding-operation training drill.

BACKGROUND ART

As virtual reality technology moves forward, various systems based on the technology have been proposed for supporting a welding-operation training drill. For example, Patent Literature 1 discloses a welding system including a welding tool for performing real-world welding, a welding helmet including a face-mounted display, and a spatial tracker configured to track the welding tool and the welding helmet in 3D space relative to an object to be worked on. The welding system is configured to generate virtual objects based on information from the spatial tracker and transmit the virtual objects at predetermined positions on the face-mounted display. This welding system enables a welding-operation training drill to be conducted while an image is checked on the face-mounted display.

CITATION LIST

Patent Literature

Patent Literature 1: JP2018-101124A

SUMMARY OF INVENTION

Technical Problem

In a case of the conventional welding system described above, the welding tool for performing the real-world welding (a torch, a welding gun, etc.) is operated, which causes inconvenience of having a large-scale apparatus configuration. Instead of using such a special tool, using an already-available VR controller or the like will be convenient. However, a difficulty in this case is to imitate an effect of shortening a welding rod in welding processing in virtual space.

The present invention is made in view of such circumstances, and a principal objective of the present invention is to provide a welding training system, a welding training method, and a program capable of supporting a welding-operation training drill with a simple configuration.

Solution to Problem

A welding training system according to one aspect of the present invention for solving the problem described above is a system welding training for supporting a welding-operation training drill by presenting a situation of a welding operation in virtual space to a trainee, the welding training system including: a determination unit configured to determine a distance between a tip of a welding rod object used for the welding operation and a parent material object based on a distance between the parent material object and a dot object used for distance determination, the dot object being located at the tip; a welding processing unit configured to perform welding processing in the virtual space when the determined distance is less than or equal to a predetermined threshold value; a corrector configured to perform, when the welding processing is performed, a correction such that an axial length of the welding rod object is shortened; a mover configured to move the dot object to the tip of the welding rod object after the correction; and a display controller configured to cause a display to display an image including the welding rod object after the correction and the dot object is moved.

In the aspect, the display controller may cause the display to display the dot object such that the dot object is transparent.

In the aspect, the welding training system may further include a setting unit configured to set a value for changing the axial length of the welding rod object, wherein the corrector may shorten the axial length of the welding rod object based on the value set by the setting unit.

In the aspect, the welding processing unit may stop the welding processing when the determined distance is greater than or equal to a predetermined threshold value.

In the aspect, the welding processing unit may stop the welding processing when the axial length of the welding rod object becomes less than or equal to a predetermined threshold value.

A welding training method according to one aspect of the present invention is a welding training method for supporting a welding-operation training drill by presenting a situation of a welding operation in virtual space to a trainee, the welding training method including: determining a distance between a tip of a welding rod object used for the welding operation and a parent material object based on a distance between the parent material object and a dot object used for distance determination, the dot object being located at the tip; performing welding processing in the virtual space when the determined distance is less than or equal to a predetermined threshold value; performing, when the welding processing is performed, a correction such that an axial length of the welding rod object is shortened; and moving the dot object to a position of the tip of the welding rod object after the correction.

A program according to one aspect of the present invention is a program for causing a computer to function as a welding training apparatus for supporting a welding-operation training drill by presenting a situation of a welding operation in virtual space to a trainee, the program causing the computer to function as: a determination unit configured to determine a distance between a tip of a welding rod object used for the welding operation and a parent material object based on a distance between the parent metal object and a dot object used for distance determination, the dot object being located at the tip; a welding processing unit configured to perform welding processing in the virtual space when the determined distance is less than or equal to a predetermined threshold value; a corrector configured to perform, when the welding processing is performed, a correction such that an axial length of the welding rod object is shortened; and a mover configured to move the dot object to a position of the tip of the welding rod object after the correction.

Advantageous Effect of Invention

According to the present invention, an effect of shortening a welding rod in welding processing can be imitated in virtual space appropriately.

DESCRIPTION OF EMBODIMENTS

Preferred embodiments of the present invention will be described below with reference to the drawings. It should be noted that the embodiments described below are for exemplifying methods and apparatuses that embody a technical concept of the present invention, and the following should not be construed as limiting the technical concept of the present invention. The technical concept of the present invention can be variously modified within the technical scope described in the claims.

Embodiment 1

[System Configuration]

Figure 1:
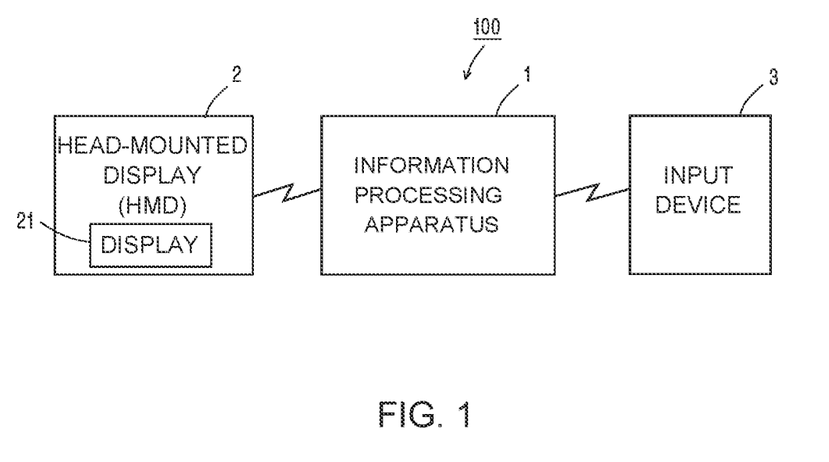
FIG. 1 is a block diagram illustrating a configuration of a welding training system according to Embodiment 1.

FIG. 1 is a block diagram illustrating a configuration of a welding training system according to Embodiment 1. A welding training system 100 of the present embodiment includes an information processing apparatus 1.

The information processing apparatus 1 is communicatively connected to a head-mounted display (HMD) 2. The HMD 2 includes a display 21, on which an image is displayed under display control from the information processing apparatus 1. The information processing apparatus 1 is also communicatively connected to an input device 3 to be operated by a trainee and performs various types of processing using information input from the input device 3.

In the present embodiment, the trainee operates the input device 3 regarded as welding equipment such as a welding torch while observing an image displayed on the display 21 of the HMD 2. The input device 3 is configured as a hand controller (VR controller) that is manually operable by the trainee. The hand controller includes a position sensor. A result of detection by the position sensor is output from the input device 3 to the information processing apparatus 1. Likewise, the HMD 2 includes a position sensor. A result of detection by the position sensor is output from the HMD 2 to the information processing apparatus 1.

Next, a configuration of the information processing apparatus 1 will be described in detail. The information processing apparatus 1 is a computer including a CPU, a RAM, a ROM, a nonvolatile memory, an input/output interface, and a communication interface. The CPU of the information processing apparatus 1 performs information processing according to a program loaded onto the RAM from the ROM or the nonvolatile memory.

The program may be supplied to the information processing apparatus 1 via, for example, an information storage medium such as an optical disk and a memory card or may be supplied over a communication network such as the Internet and a LAN.

Figure 2:
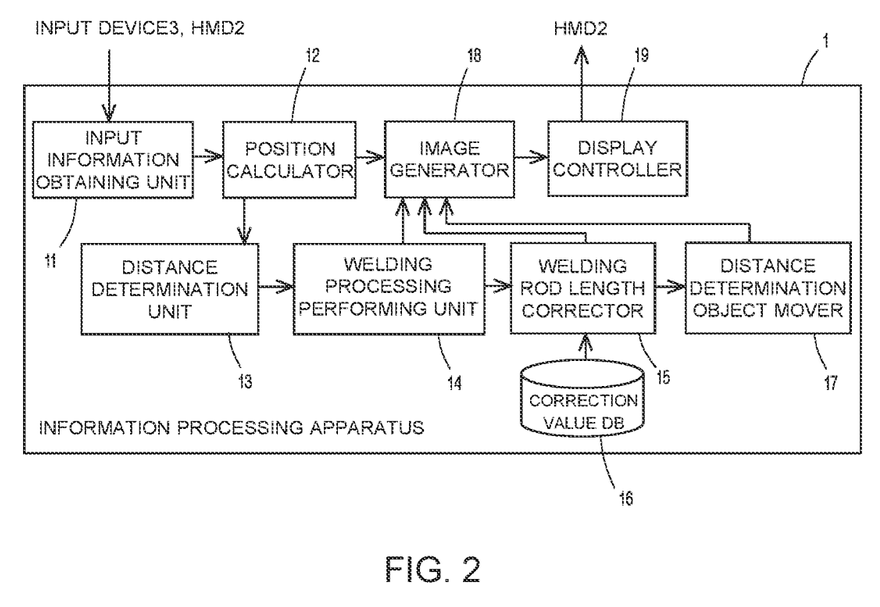
FIG. 2 is a functional block diagram illustrating a configuration of an information processing apparatus (the welding training system).

FIG. 2 is a functional block diagram illustrating the configuration of the information processing apparatus 1. The information processing apparatus 1 includes an input information obtaining unit 11, a position calculator 12, a distance determination unit 13, a welding processing performing unit 14, a welding rod length corrector 15, a correction value database (DB) 16, a distance determination object mover 17, an image generator 18, and a display controller 19. These functional units are implemented by the CPU of the information processing apparatus 1 performing the information processing according to the program.

The input information obtaining unit 11 obtains various types of information that are input from the input device 3 and the HMD 2. Information input from the input device 3 includes position information indicating a position of the input device 3 operated by the trainee and selection information indicating a selection made by the trainee with the input device 3. Information input from the HMD 2 includes position information indicating a position of the HMD 2.

The position calculator 12 calculates positions of objects displayed in virtual space based on the position information input from the input device 3 and the HMD 2.

The distance determination unit 13 determines a distance between a tip of a welding rod object described later and parent material objects. The distance is determined based on a distance between the parent material objects and a dot object that is used for distance determination and located at the tip of the welding rod object (hereinafter, referred to as "distance determination object").

The welding processing performing unit 14 performs welding processing based on the distance between the tip of the welding rod object and the parent material objects determined by the distance determination unit 13. By this welding processing, in a case of arc welding, for example, an effect such as sparking is imitated.

The welding rod length corrector 15 corrects a length of the welding rod object to imitate, in virtual space, an effect of shortening an axial length of a welding rod as welding processing proceeds. A degree of the shortening is specified as a set value stored in the correction value DB 16.

The correction value DB 16 is a database that stores set values used for correcting the length of the welding rod object (correction values) as described above. In the correction value DB 16, a correction value is specified for each type of welding. For example, as types of welding, three types of welding including arc welding, semi-automatic welding, and tungsten inert gas (TIG) welding are defined, and different correction values (3.5 mm, 4.5 mm, etc. per second) are specified for the types of welding. It should be noted that the correction value DB 16 may be provided outside the information processing apparatus 1 as long as the correction value DB 16 is accessible to the information processing apparatus 1.

The distance determination object mover 17 moves the distance determination object in the virtual space as the welding rod object is shortened. As will be described later, the distance determination object moves following the tip of the shortened welding rod object.

The image generator 18 generates an image to be displayed in the virtual space based on the positions of the objects detected by the position calculator 12, whether the welding processing is performed by the welding processing performing unit 14, correction processing by the welding rod length corrector 15, and/or movement processing by the distance determination object mover 17.

The display controller 19 commands the HMD 2 to display the image generated by the image generator 18. As a result, the image generated by the image generator 18 is displayed on the display 21 of the HMD 2.

Figure 3:
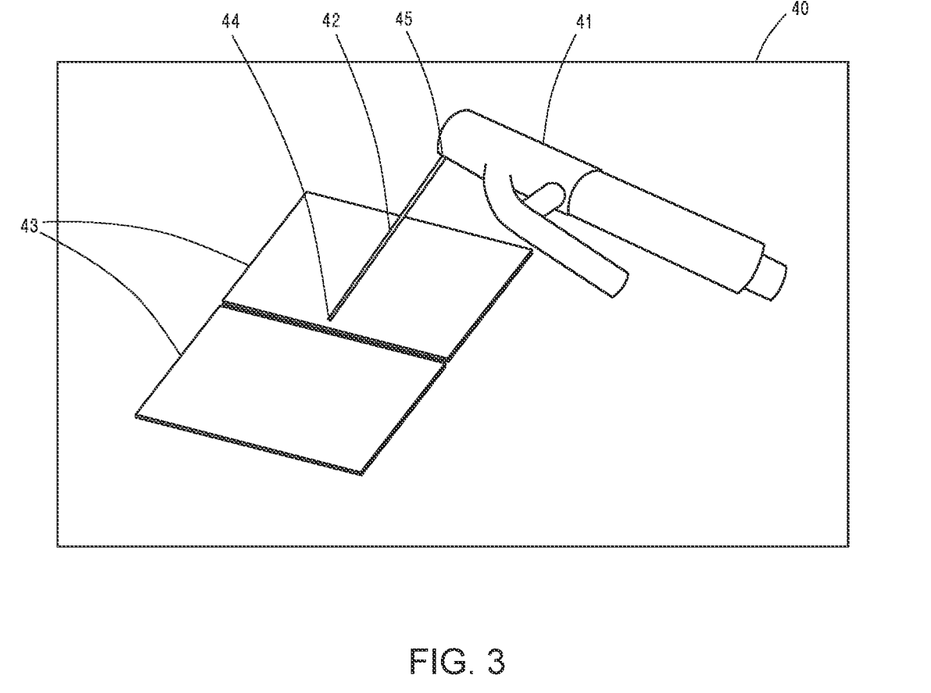
FIG. 3 is a diagram illustrating an example of a screen displayed.

FIG. 3 is a diagram illustrating an example of a screen displayed on the display 21 of the HMD 2. In the example illustrated in FIG. 3, a screen 40 includes a torch object 41 corresponding to a torch that is the welding equipment, a welding rod object 42 corresponding to a welding rod attached to the torch, and parent material objects 43 corresponding to materials to be welded together (parent materials). The screen 40 further includes a distance determination object 44 that is a dot object located at the tip of the welding rod object 42, and a proximal end object 45 that is a dot object located at a proximal end of the welding rod object 42.

In the present embodiment, the distance determination object 44 and the proximal end object 45 are displayed transparent. The distance determination object 44 and the proximal end object 45 are therefore not visually checked on the screen 40 by the trainee. It should be noted that the distance determination object 44 and the proximal end object 45 may be displayed with a color rather than being transparent but are preferably displayed transparent because there are no counterparts of them in real space. However, as will be described later, since the distance determination object 44 and the proximal end object 45 move following the tip and the proximal end of the welding rod object 42, respectively, displaying them with an inconspicuous color (e.g., the same color as the welding rod object 42) will cause no particular problem.

The torch object 41 and the welding rod object 42 move in the virtual space in response to an operation on the input device 3 by the trainee. The welding processing is then performed based on the distance between the tip of the welding rod object 42 and the parent material objects 43. A situation of such a welding operation in the virtual space is displayed on the display 21 of the HMD 2.

[Operation of System]

Next, the operation of the welding training system 100 configured as described above will be described with reference to flowcharts illustrated in FIG. 4 and FIG. 5.

A trainee wears the HMD 2 and checks types of training drills displayed on the display 21 of the HMD 2. The types of training drills include the types of welding (arc welding, semi-automatic welding, TIG welding), types of parent materials (fillet, V-shape groove), and positions of the parent materials disposed (downward, vertical, horizontal). From among the types of welding, the types of parent materials, and the positions of the parent materials disposed, the trainee determines a desired type of welding, a desired type of parent materials, and a desired position of the parent materials disposed and selects them with the input device 3.

Figure 4:
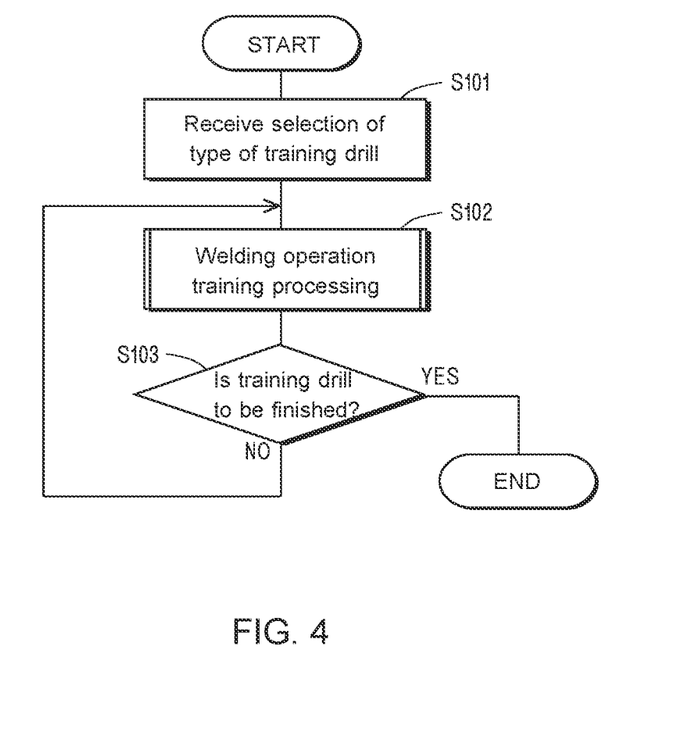
FIG. 4 is a flowchart illustrating a procedure of operation of the information processing apparatus (the welding training system).
Figure 5:
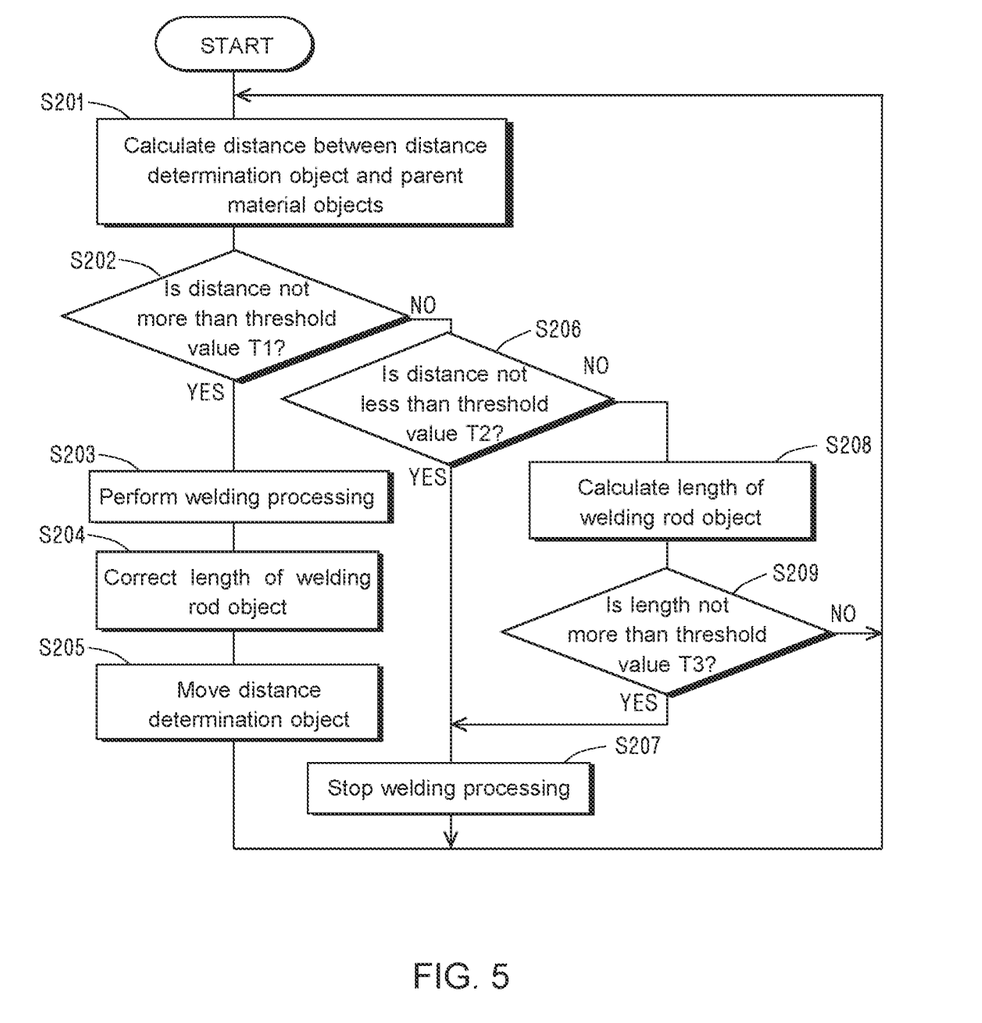
FIG. 5 is a flowchart illustrating a procedure of welding rod shortening processing.

As illustrated in FIG. 4, upon receiving the selection made with the input device 3 in the above-described manner (S101), the information processing apparatus 1 performs welding operation training processing for conducting a training drill of the selected type (S102). In the welding operation training processing, position information indicating the position of the input device 3 operated by the trainee and position information indicating the position of the HMD 2 worn on the trainee's head are input into the information processing apparatus 1 continuously. Based on the pieces of positional information, the information processing apparatus 1 calculates positions of the objects such as the torch object 41, the welding rod object 42, the parent material objects 43, the distance determination object 44, and the proximal end object 45 in the virtual space and generates an image according to a result of the calculation. The image thus generated is transmitted from the information processing apparatus 1 to the HMD 2 and displayed on the display 21 of the HMD 2.

It should be noted that when the welding rod object 42 moves in the virtual space with an operation made by the trainee, positions of the tip and the proximal end of the welding rod object 42 are changed with the movement. At this time, with the changes in the positions of the tip and the proximal end of the welding rod object 42, the information processing apparatus 1 changes the positions of the distance determination object 44 and the proximal end object 45. By performing such processing, a state where the distance determination object 44 and the proximal end object 45 are located at the tip and the proximal end of the welding rod object 42, respectively, can be maintained.

In the welding operation training processing, welding rod shortening processing for imitating, in the virtual space, the effect of shortening an axial length of a welding rod as the welding processing proceeds is performed. The welding rod shortening processing will be described later in detail.

After a course of the training drill is conducted by the welding operation training processing in step S102, the information processing apparatus 1 determines whether to finish the training drill (S103). For example, the information processing apparatus 1 determines that the training drill is to be finished (YES in S103) when the trainee commands with the input device 3 that the training drill be finished or when the number of repetitions or a duration of the training drill reaches a predetermined number or duration, and the processing is finished. In contrast, when determining that the training drill is not to be finished but to be continued (NO in S103), the information processing apparatus 1 returns to step S102, where the training drill is conducted again.

Next, the welding rod shortening processing will be described in detail with reference to FIG. 5. It should be noted that the welding rod shortening processing is repeated in the welding operation training processing described above.

The information processing apparatus 1 calculates a distance between the distance determination object 44 located at the tip of the welding rod object 42 and the parent material objects 43 (S201) and determines whether the distance is less than or equal to a threshold value T1 that is set in advance (S202). As the threshold value T1, a value such as 0.1 mm is set.

When determining that the distance calculated in step S202 is less than or equal to the threshold value T1 (YES in S202), the information processing apparatus 1 performs the welding processing (S203). In this manner, in the present embodiment, the welding processing is performed when the distance between the distance determination object 44 and the parent material objects 43 becomes less than or equal to a certain value. This is because the distance can be regarded as a distance between the tip of the welding rod object 42 and the parent material objects 43. After the welding processing is thus performed, shortening the welding rod object 42 and moving the distance determination object 44, which become necessary as the welding processing proceeds, are performed.

The information processing apparatus 1 first performs correction processing, in which an axial length of the welding rod object 42 is shortened according to a correction value specified in the correction value DB 16 (S204). For example, in a case where the arc welding is selected for a current training drill, and when a correction value of 3.5 mm per second is specified for the arc welding in the correction value DB 16, the information processing apparatus 1 shortens the axial length of the welding rod object 42 by moving the tip of the welding rod object 42 in an axial direction toward the proximal end by 3.5 mm every second.

Next, the information processing apparatus 1 moves the distance determination object 44 so that the distance determination object 44 follows the tip of the welding rod object 42 that has been shortened in the above-described manner (S205). More specifically, the information processing 1 apparatus calculates three-dimensional position coordinates pos_e1_new of the distance determination object 44 in the virtual space after the length of the welding rod is corrected, according to Expression 1 below, and moves the distance determination object 44 to the calculated position coordinates pos_e1_new.

$$\text{pos\_e1\_new} = \text{pos\_e1} - \text{shorten\_distance} \times (\text{pos\_e1} - \text{pos\_e2})/\text{edge\_distance} \quad \text{Expression 1}$$

Note that pos_e1 denotes current three-dimensional position coordinates (e1.x, e1.y, e1.z) of the distance determination object 44, and pos_e2 denotes current three-dimensional position coordinates (e2.x, e2.y, e2.z) of the proximal end object 45. Further, shorten distance denotes the correction value used for correcting the length of the welding rod object 42 in step S204. In addition, edge_distance denotes a distance between pos_e1 and pos_e2 and is calculated according to Expression 2 below.

$$\text{edge\_distance} = \sqrt{(e1.x - e2.x)^2 + (e1.y - e2.y)^2 + (e1.z - e2.z)^2} \quad \text{Expression 2}$$

After the correction of the length of the welding rod (S204) and the movement of the distance determination object 44 (S205) are performed in the above-described manner, the information processing apparatus 1 returns to step S201 and repeats the processing of step S201 and its subsequent steps.

When determining in step S202 described above that the distance is greater than the threshold value T1 (NO in S202), the information processing apparatus 1 determines whether the distance is less than or equal to a threshold value T2 that is set in advance (S206). It should be noted that the threshold value T2 is greater than the threshold value T1. For example, a value such as 10.0 mm is set as the threshold value T2.

When determining in step S206 that the distance is greater than or equal to the threshold value T2 (YES in S206), the information processing apparatus 1 stops the welding processing having been performed (S207). In this manner, in the present embodiment, the welding processing is stopped when the distance between the distance determination object 44 and the parent material objects 43 becomes less than or equal to a certain value. This is because the distance can be regarded as a distance between the tip of the welding rod object 42 and the parent material objects 43. The information processing apparatus 1 then returns to step S201 and repeats the processing of step S201 and its subsequent steps.

When determining in step S206 that the distance is less than the threshold value T2 (NO in S206), the information processing apparatus 1 calculates the length of the welding rod object 42 (S208). The length is obtained as the distance between pos_e1 and pos_e2, namely edge_distance.

The information processing apparatus 1 next determines whether the length of the welding rod object 42 is less than or equal to a threshold value T3 that is set in advance (S209). As the threshold value T3, a value indicating such a length of the welding rod as to be unsuitable for continuing the welding processing (e.g., 20.0 mm etc.) is set.

When determining in step S208 that the length of the welding rod object 42 is less than or equal to the threshold value T3 (YES in S209), the information processing apparatus 1 stops the welding processing having been performed (S207). In this manner, in the present embodiment, the welding processing is stopped when the length of the welding rod object 42 becomes such a length as to be unsuitable for the welding processing. The information processing apparatus 1 then returns to step S201 and repeats the processing of step S201 and its subsequent steps.

In contrast, when determining in step S208 that the length of the welding rod object 42 is greater than the threshold value T3 (NO in S209), the information processing apparatus 1 returns to step S201 without stopping the welding processing and repeats the processing of step S201 and its subsequent steps.

By performing the welding rod shortening processing described above repeatedly, the welding processing is performed/stopped based on the distance between the distance determination object 44 and the parent material objects 43, and when the welding processing is performed, the welding rod object 42 is subjected to the correction for shortening the welding rod object 42. This enables the effect of shortening the welding rod in the welding processing to be imitated in the virtual space.

Consider adopting an approach of directly obtaining a distance between the tip of the welding rod object 42 and the parent material objects 43 without using the distance determination object 44. In this case, there is a problem in that the tip is a region constituted by a plurality of points, and it is unclear which of the points constituting the tip should be used to obtain the distance to the parent material objects 43. The occurrence of such a problem can be circumvented by introducing the distance determination object 44 for obtaining the distance to the parent material objects 43 as in the present embodiment.

In addition, the distance determination object 44 is an object different from the welding rod object 42. Therefore, when the welding rod object 42 is shortened as the welding processing is performed, the distance between the tip of the welding rod object 42 and the parent material objects 43 cannot be obtained appropriately unless the distance determination object 44 is moved with the shortening of the welding rod object 42. Thus, in the present embodiment, the distance determination object 44 is moved so as to follow the tip of the welding rod object 42 that moves toward the proximal end by the shortening. The distance determination object 44 can be thereby located at the tip of the shortened welding rod object 42. Consequently, the distance between the tip of the welding rod object 42 and the parent material objects 43 can be obtained appropriately with the distance determination object 44.

Embodiment 2

Figure 6:
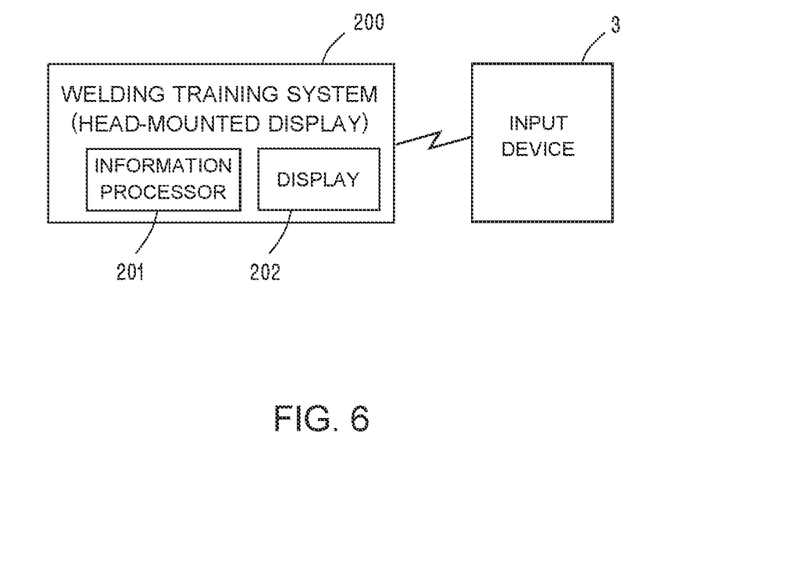
FIG. 6 is a block diagram illustrating a configuration of a welding training system according to Embodiment 2.

In Embodiment 2, the information processing apparatus and the HMD in Embodiment 1 are integrated into one apparatus. FIG. 6 is a block diagram illustrating a configuration of a welding training system in Embodiment 2. As illustrated in FIG. 6, a welding training system 200 of the present embodiment is configured as an HMD and includes an information processor 201 and a display 202. The information processor 201 is equivalent to the information processing apparatus 1 in Embodiment 1, and the display 202 is equivalent to the display 21 in Embodiment 1. The welding training system 200 is communicatively connected to an input device 3 as in Embodiment 1.

The information processor 201 performs the same processing as that performed by the information processing apparatus 1 in Embodiment 1 and causes the display 202 to display a situation of a welding operation in virtual space. The present embodiment thus provides the same advantageous effects as in Embodiment 1.

Other Embodiments

In the embodiments described above, a head-mounted display is used, but the present invention is not limited to the use of a head-mounted display. For example, another type of wearable device such as a glasses-type display may be used.

REFERENCE SIGNS LIST 1 information processing apparatus
11 input information obtaining unit
12 position calculator
13 distance determination unit
14 welding processing performing unit
15 welding rod length corrector
16 correction value database
17 distance determination object mover
18 image generator
19 display controller
2 head-mounted display
21 display
3 input device
41 torch object
42 welding rod object
43 parent material object
44 distance determination object
45 proximal end object
100, 200 welding training system

The invention claimed is:

1. A welding training system, comprising:
an information processing apparatus configured to perform a welding-operation training drill in a virtual space, wherein performing the welding-operation training drill by the information processing apparatus includes:
continuously tracking a distance between a distance determination object and a parent material object in the virtual space, wherein the distance determination object is disposed at a tip of a welding rod object in the virtual space;
simulating performance of a welding process in the virtual space in response to the distance being less than or equal to a distance threshold, wherein performing the welding process includes:
automatically shortening an axial length of the welding rod object in the virtual space by a predetermined distance per unit time; and
correspondingly adjusting a position of the distance determination object in the virtual space, such that the distance determination object remains located at the tip of the welding rod object as the axial length of the welding rod object is shortened; and
ceasing to perform the welding process in response to the distance being greater than the distance threshold.

2. The welding training system according to claim 1, further comprising a head-mounted display including a display screen in electronic communication with the information processing apparatus, wherein the information processing apparatus is further configured to control the display screen during the welding-operation training drill to continuously display an image of the virtual space including the welding rod object and the parent material object, wherein the distance determination object is transparent in the image displayed on the display screen.

3. The welding training system according to claim 1, wherein the predetermined distance per unit time is selected from a plurality of preset time-based length correction values.

4. The welding training system according to claim 1, wherein the information processing apparatus is further configured to:
track the axial length of the welding rod object; and
cease to perform the welding process in response to the axial length of the welding rod object being less than or equal to a length threshold.

5. A welding training method for performing a welding-operation training drill in a virtual space for a trainee, the welding training method comprising:
continuously tracking a distance between a parent material object and a distance determination object in the virtual space, wherein the distance determination object is disposed at a tip of a welding rod object in the virtual space;
performing a welding process in the virtual space when the distance is less than or equal to a predetermined threshold value, wherein performing the welding process includes:
automatically shortening an axial length of the welding rod object by a predetermined distance per unit time; and
adjusting a position of the distance determination object in the virtual space, such that the distance determination object remains located at the tip of the welding rod object as the axial length of the welding rod object is shortened during the welding process; and
ceasing to perform the welding process when the distance is greater than the predetermined threshold value.

6. A non-transitory storage medium storing a program including a plurality of instructions configured to be executed by one or more processors of a computer to perform a welding-operation training drill in a virtual space, wherein performing the welding-operation training drill by the one or more processors executing the plurality of instructions includes:
tracking a distance between a distance determination object and a parent material object in the virtual space, wherein the distance determination object is disposed at a tip of a welding rod object in the virtual space;
performing a welding process in the virtual space in response to determining the distance is less than or equal to a predetermined threshold, wherein performing the welding process includes;
shortening an axial length of the welding rod object in the virtual space by a predetermined distance per unit time; and
correspondingly adjusting a position of the distance determination object in the virtual space, such that the distance determination object remains located at the tip of the welding rod object as the axial length of the welding rod object is shortened during the welding process.

7. The welding training system of claim 1, further comprising:
a head-mounted display (HMD) in electronic communication with the information processing apparatus, wherein the head-mounted display includes a display screen and a first position sensor configured to detect a first physical position of the HMD in a physical space; and
an input device in electronic communication with the information processing apparatus, wherein the input device includes a second position sensor configured to detect a second physical position of the input device in the physical space.

8. The welding training system of claim 7, wherein performing the welding-operation training drill by the information processing apparatus further comprises:
receiving the first physical position from the HMD and the second physical position from the input device; and
calculating respective virtual positions of the welding rod object, the distance determination object, and the parent material object in the virtual space based on the first physical position and the second physical position.

9. The welding training system of claim 8, wherein performing the welding-operation training drill further comprises:
generating an image of the virtual space including the welding rod object and the parent material object disposed at the respective virtual positions in the image; and
controlling the display screen to display the image.

10. The welding training system of claim 9, wherein performing the welding-operation training drill by the information processing apparatus further comprises shortening the axial length of the welding rod object in the image displayed on the display screen by the predetermined distance per unit time when performing the welding process.

11. The welding training method of claim 5, further comprising:
continuously tracking the axial length of the welding rod object; and
ceasing to perform the welding process in response to the axial length of the welding rod object being less than or equal to a threshold length.

12. The welding training method of claim 5, further comprising:
receiving a first physical position of a head-mounted display (HMD) and a second physical position of an input device in a physical space; and
calculating respective virtual positions of the welding rod object, the distance determination object, and the parent material object in the virtual space based on the first physical position and the second physical position.

13. The welding training method of claim 12, further comprising:
generating an image of the virtual space including the welding rod object, the distance determination object, and the parent material object disposed at the respective virtual positions; and
controlling a display screen of the HMD to display the image.

14. The welding training method of claim 13, further comprising continuously updating the image displayed on the display screen, wherein continuously updating the image includes shortening the axial length of the welding rod object displayed on the display screen by the predetermined distance per unit time when performing the welding process.

15. The non-transitory storage medium of claim 6, wherein performing the welding-operation training drill by the one or more processors executing the plurality of instructions further includes ceasing to perform the welding process in response to determining the distance is greater than the predetermined threshold.

16. The non-transitory storage medium of claim 6, wherein performing the welding-operation training drill by the one or more processors executing the plurality of instructions further includes:
receiving a first physical position of a head-mounted display (HMD) and a second physical position of an input device in a physical space; and
calculating respective virtual positions of the welding rod object, the distance determination object, and the parent material object in the virtual space based on the first physical position and the second physical position.

17. The non-transitory storage medium of claim 16, wherein performing the welding-operation training drill by the one or more processors executing the plurality of instructions further includes:
generating an image of the virtual space including the welding rod object and the parent material object disposed at the respective virtual positions; and
controlling a display screen of the HMD to display the image.

18. The non-transitory storage medium of claim 17, wherein performing the welding-operation training drill by the one or more processors executing the plurality of instructions further includes continuously updating the image displayed on the display screen, and wherein continuously updating the image includes shortening the axial length of the welding rod object displayed on the display screen by the predetermined distance per unit time when performing the welding process.

* * * * *